United States Patent
Soza

(10) Patent No.: US 11,465,701 B2
(45) Date of Patent: Oct. 11, 2022

(54) TRAINING WHEEL ASSEMBLY

(71) Applicant: Katherine Soza, Topeka, KS (US)

(72) Inventor: Katherine Soza, Topeka, KS (US)

(*) Notice: Subject to any disclaimer, the term of this patent is extended or adjusted under 35 U.S.C. 154(b) by 184 days.

(21) Appl. No.: 16/886,051

(22) Filed: May 28, 2020

(65) Prior Publication Data
US 2021/0371025 A1 Dec. 2, 2021

(51) Int. Cl.
B62H 1/12 (2006.01)
B62H 7/00 (2006.01)

(52) U.S. Cl.
CPC ............... *B62H 1/12* (2013.01); *B62H 7/00* (2013.01)

(58) Field of Classification Search
CPC .................................... B62H 1/12; B62H 7/00
See application file for complete search history.

(56) References Cited

U.S. PATENT DOCUMENTS

| | | | |
|---|---|---|---|
| 4,595,213 A | 6/1986 | Tsuchie | |
| 4,615,535 A * | 10/1986 | McMurtrey | B62H 1/12 280/293 |
| 5,100,163 A * | 3/1992 | Egley | B62H 1/12 280/293 |
| 6,213,237 B1 * | 4/2001 | Willman | B62H 1/12 180/209 |
| 6,331,012 B1 * | 12/2001 | Eisenmann, II | B62H 1/12 280/293 |
| 6,994,368 B2 | 2/2006 | Brown | |
| 7,641,213 B1 * | 1/2010 | Chen | B62H 1/12 280/293 |
| 7,712,759 B2 | 5/2010 | Bell | |
| 2008/0157502 A1 * | 7/2008 | Fu | B62K 3/08 280/278 |
| 2019/0106168 A1 * | 4/2019 | Khouri | B62H 7/00 |

* cited by examiner

Primary Examiner — Tony H Winner

(57) ABSTRACT

A training wheel assembly for assisting a physically disabled user with riding a bicycle includes a pair of brackets that is each mountable on opposite sides of a rear wheel of a bicycle. A pair of shock absorbers is each integrated into a respective one of the brackets such that each of the brackets is compressible and expandable. A pair of rollers is each of rotatably coupled to a respective one of the brackets to roll along a support surface when the bicycle is ridden. Each of the rollers is positioned on opposite sides of the bicycle to inhibit the bicycle from tipping thereby assisting a physically disabled user with riding the bicycle.

5 Claims, 5 Drawing Sheets

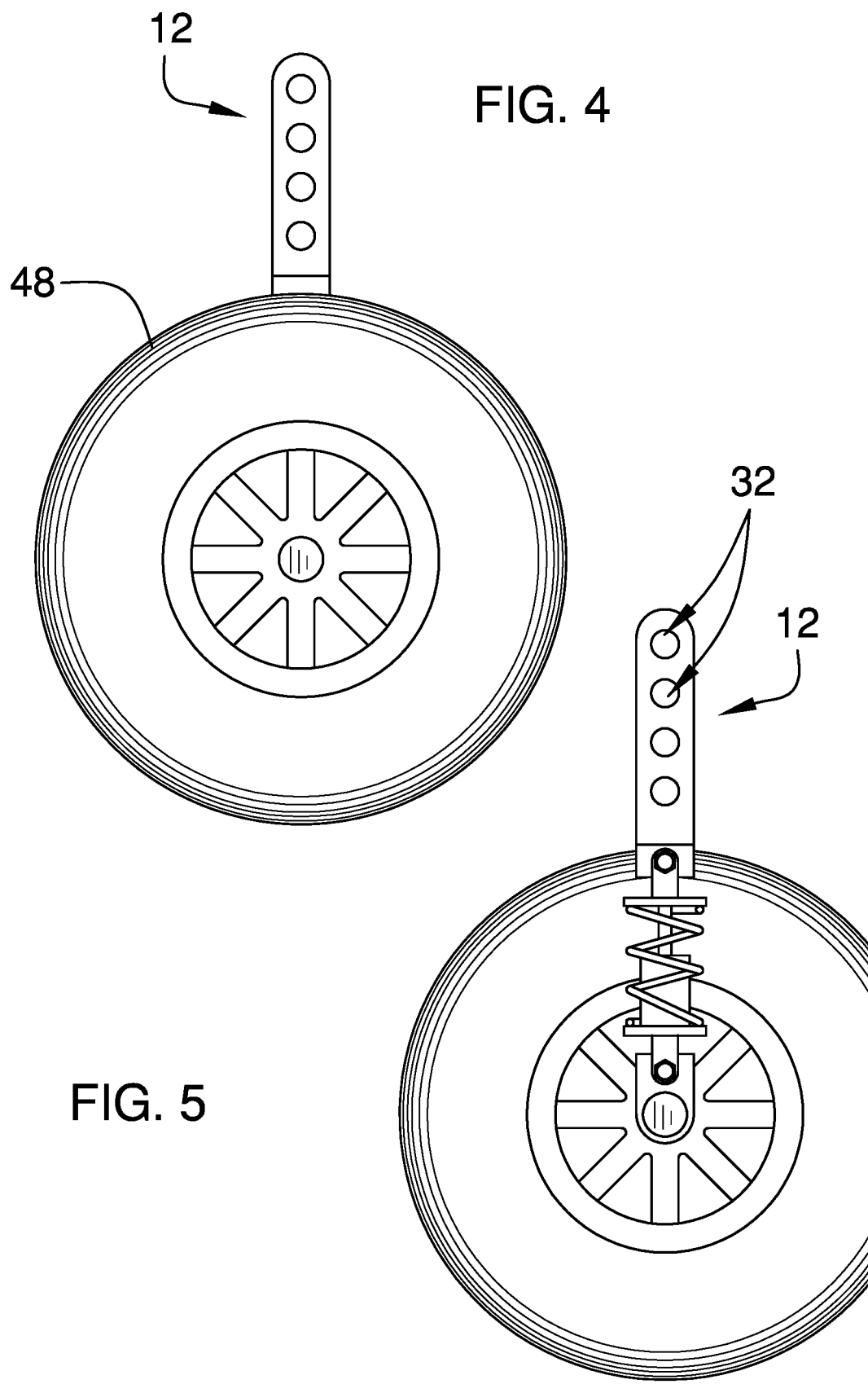

TRAINING WHEEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to training devices and more particularly pertains to a new training device for assisting a physical disabled user with riding a bicycle.

(2) Description of Related Art Including Information Disclosed Under 37 CFR 1.97 and 1.98

The prior art relates to training devices including a modular training wheel device for a bicycle. The prior art discloses a training wheel device that includes a spring and a pivoting arm to facilitate a bicycle to sway back and forth. The prior art discloses a training wheel device that includes a two piece bracket and a shock absorber extending between the two pieces. The prior art also disclose a training wheel device that is comprised of flattened strip material. The prior art also discloses a training wheel device that mounts to a frame of a bicycle adjacent to pedals of the bicycle.

BRIEF SUMMARY OF THE INVENTION

An embodiment of the disclosure meets the needs presented above by generally comprising a pair of brackets that is each mountable on opposite sides of a rear wheel of a bicycle. A pair of shock absorbers is each integrated into a respective one of the brackets such that each of the brackets is compressible and expandable. A pair of rollers is each of rotatably coupled to a respective one of the brackets to roll along a support surface when the bicycle is ridden. Each of the rollers is positioned on opposite sides of the bicycle to inhibit the bicycle from tipping thereby assisting a physically disabled user with riding the bicycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a right side view of an embodiment of the disclosure.

FIG. 5 is a left side view of an embodiment of the disclosure.

DETAILED DESCRIPTION OF THE INVENTION

Figure 1:
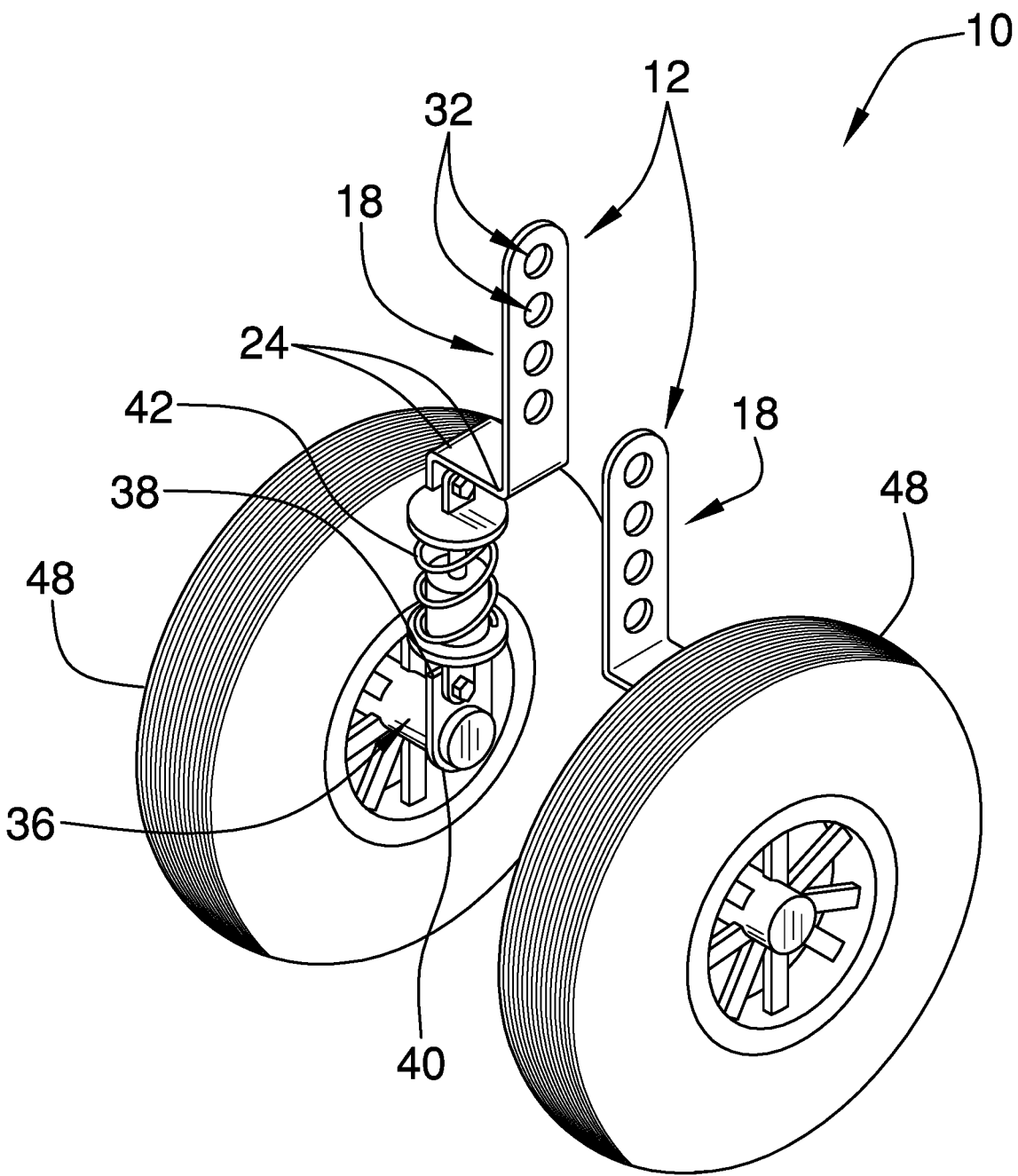
FIG. 1 is a perspective view of a training wheel assembly according to an embodiment of the disclosure.
Figure 2:
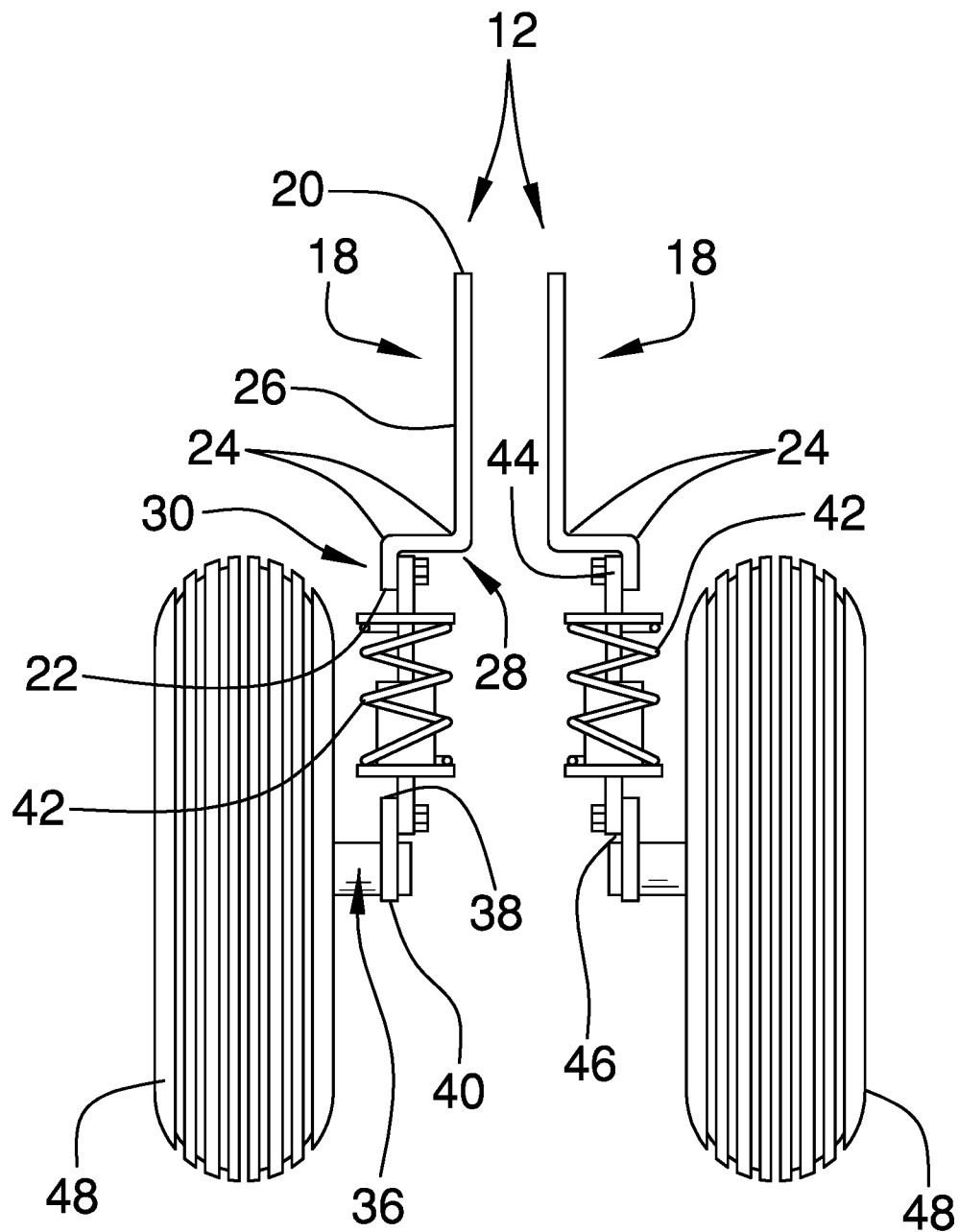
FIG. 2 is a front view of an embodiment of the disclosure.
Figure 3:
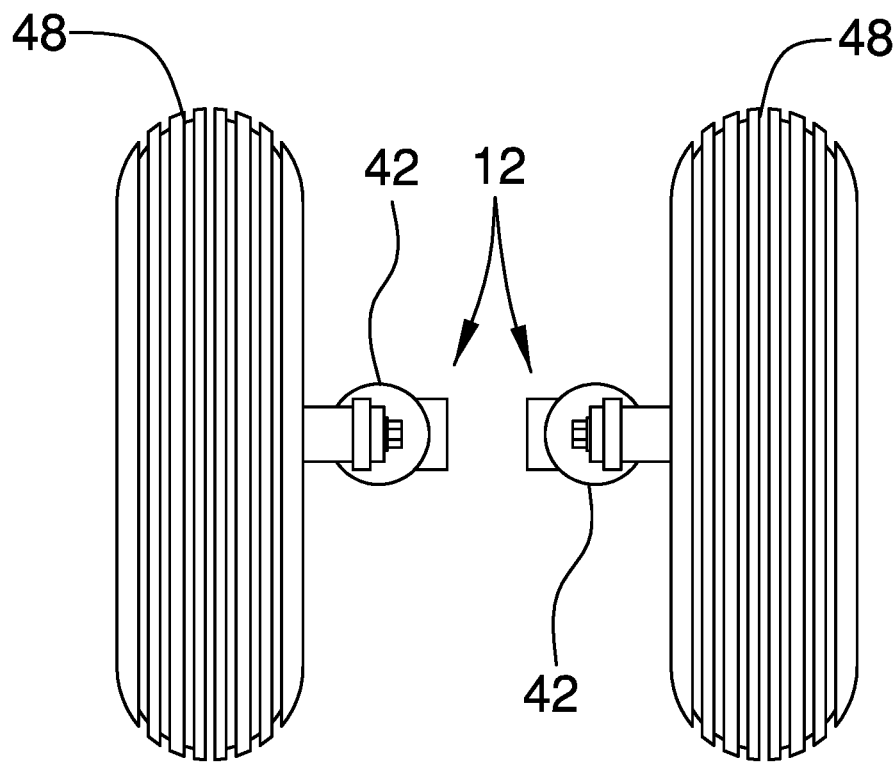
FIG. 3 is a bottom view of an embodiment of the disclosure.
Figure 6:
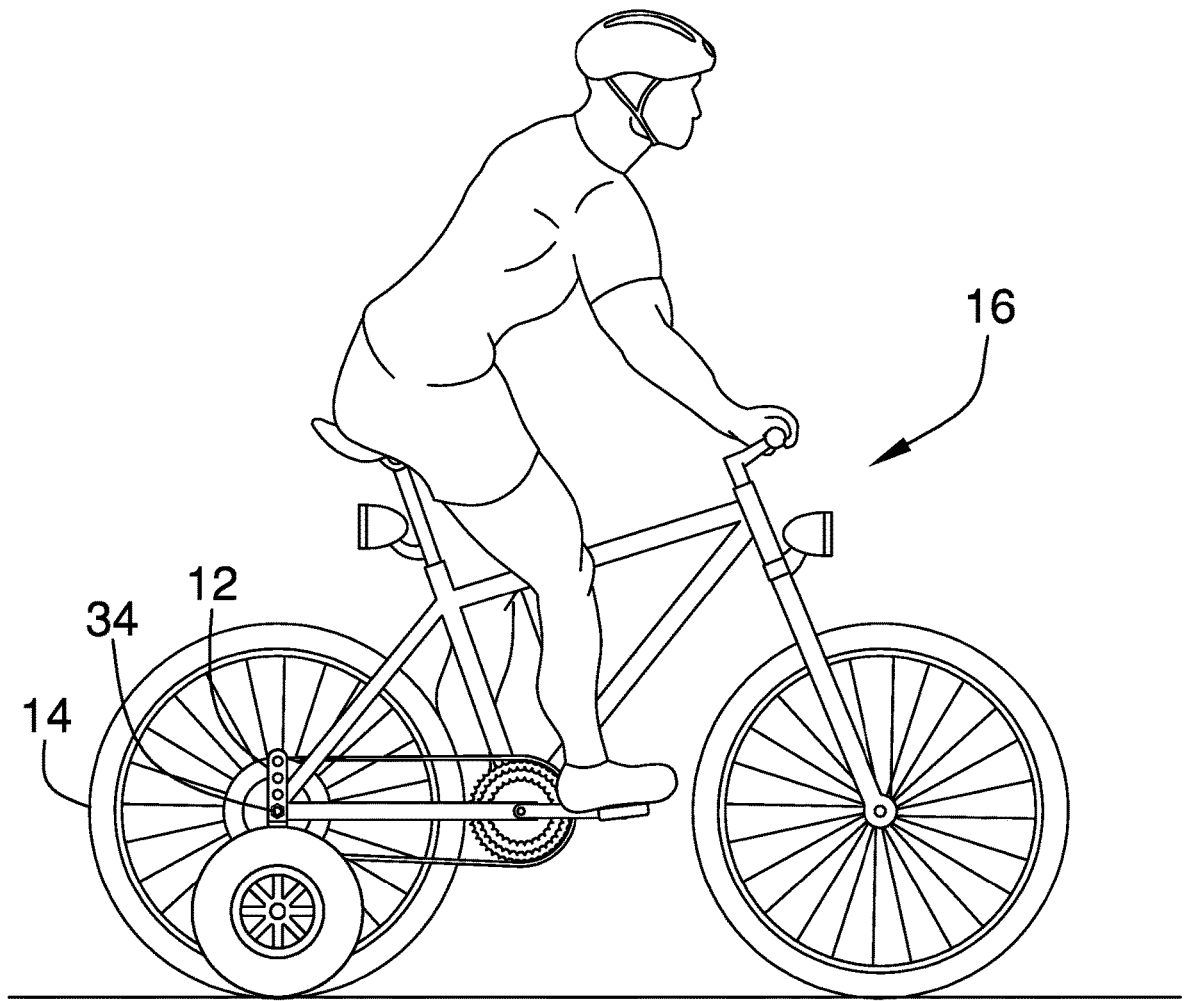
FIG. 6 is a perspective in-use view of an embodiment of the disclosure.

With reference now to the drawings, and in particular to FIGS. 1 through 6 thereof, a new training device embodying the principles and concepts of an embodiment of the disclosure and generally designated by the reference numeral 10 will be described.

As best illustrated in FIGS. 1 through 6, the training wheel assembly 10 generally comprises a pair of brackets 12 that is each mountable on opposite sides of a rear wheel 14 of a bicycle 16. Each of the brackets 12 comprises a first portion 18 that has a first end 20 and a second end 22. The first portion 18 has a pair of bends 24 each being positioned between the first end 20 and the second end 22 to define an upper section 26 forming an angle with a middle section 28 and a lower section 30 forming an angle with the middle section 28. The first end 20 is associated with the upper section 26 and the second end 22 is associated with the lower section 30.

The angle formed by the upper section 26 and the middle section 28 is supplementary with the angle formed by the middle section 28 and the lower section 30. The upper section 26 has a plurality of apertures 32 each extending therethrough and the apertures 32 are spaced apart from each other and are distributed between the middle section 28 and the first end 20. A respective one of the apertures 32 receives an axle 34 of the rear wheel 14 of the bicycle 16 having the first portion 18 extending downwardly from the axle 34. In this way each of the brackets 12 are attached to the bicycle 16. Additionally, each of the brackets 12 includes a second portion 36 that has an upper end 38 a lower end 40.

A pair of shock absorbers 42 is each integrated into a respective one of the brackets 12 such that each of the brackets 12 is compressible and expandable. Each of the shock absorbers 42 has a top end 44 and a bottom end 46, and the top end 44 of each of the shock absorbers 42 is coupled to the second end 22 of the first portion 18 of the respective bracket 12. The bottom end 46 of each of the shock absorbers 42 is coupled to the upper end 38 of the second portion 36 of the respective bracket 12. In this way the first portion 18 is urgeable toward or away from the second portion 36. Each of the shock absorbers 42 may comprise a coil over gas shock or other similar shock absorber.

A pair of rollers 48 is each rotatably coupled to a respective one of the brackets 12 for rolling along a support surface 50 when the bicycle 16 is ridden. Each of the rollers 48 is positioned on opposite sides of the bicycle 16 to inhibit the bicycle 16 from tipping. In this way the brackets 12 and rollers 48 assist a physically disabled user with riding the bicycle 16. Each of the shock absorbers 42 facilitates each of the rollers 48 to move upwardly and downwardly on the support surface 50 to enhance comfort for the physically disabled user.

Each of the rollers 48 is positioned adjacent to the lower end 40 of the second portion 36 of the respective bracket 12. Each of the rollers 48 is oriented such that each of the rollers 48 has a rotational axis that is oriented perpendicular to an axis extending through the upper end 38 and the lower end 40 of the second portion 36 of the respective bracket 12. Each of the rollers 48 may comprise an inflatable tire or the like with a width of at least 3.0 inches. In this way the rollers 48 facilitate greater stability compared to training wheels for children's bicycles.

In use, each of the brackets 12 is coupled to the axle 34 of the rear wheel 14 of the bicycle 16 at a height that facilitates the rollers 48 to roll on the support surface 50 along with the rear wheel 14 of the bicycle 16. In this way the rollers 48 inhibit the bicycle 16 from tipping when the physically disabled user rides the bicycle 16. Additionally, the shock absorbers 42 enhance comfort for the physically disabled user while riding the bicycle 16. Moreover, the shock absorbers 42 reduce the likelihood that bumps on the support surface 50 will tip bicycle 16 over thereby enhancing safety for the physically disabled user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A training wheel assembly for mounting on an adult bicycle for assisting a physically disabled rider to ride the adult bicycle, said assembly comprising:
   a pair of brackets, each of said brackets being mountable on opposite sides of a rear wheel of a bicycle;
   a pair of shock absorbers, each of said shock absorbers being integrated into a respective one of said brackets such that each of said brackets is compressible and expandable;
   a pair of rollers, each of said rollers being rotatably coupled to a respective one of said brackets wherein each of said rollers is configured to roll along a support surface when the bicycle is ridden, each of said rollers being positioned on opposite sides of the bicycle wherein each of said rollers is configured to inhibit the bicycle from tipping thereby assisting a physically disabled user with riding the bicycle, each of said shock absorbers facilitating each of said rollers to move upwardly and downwardly on the support surface wherein each of said shock absorbers is configured to enhance comfort for the physically disabled user; and
   each of said brackets comprises a first portion having a first end and a second end, said first portion having a pair of bends each being positioned between said first end and said second end to define an upper section forming an angle with a middle section and a lower section forming an angle with said middle section, said upper section having said first end being associated therewith, said lower section having said second end being associated therewith, said angle formed by said upper section and said middle section being supplementary with said angle formed by said middle section and said lower section, wherein each of said brackets includes a second portion having an upper end and a lower end.

2. The assembly according to claim 1, wherein said upper section has a plurality of apertures each extending therethrough, said apertures being spaced apart from each other and being distributed between said middle section and said first end, a respective one of said apertures receiving an axle of the rear wheel of the bicycle having said first portion extending downwardly from the axle.

3. The assembly according to claim 1, wherein each of said shock absorbers has a top end and a bottom end, said top end of each of said shock absorbers being coupled to said second end of said first portion of said respective bracket, said bottom end of each of said shock absorbers being coupled to said upper end of said second portion of said respective bracket such that said first portion is urgeable toward or away from said second portion.

4. The assembly according to claim 1, wherein each of said rollers is positioned adjacent to said lower end of said second section of said respective bracket, each of said rollers being oriented such that each of said roller has a rotational axis being oriented perpendicular to an axis extending through said upper end and said lower end of said second section of said respective bracket.

5. A training wheel assembly for mounting on an adult bicycle for assisting a physically disabled rider to ride the adult bicycle, said assembly comprising:
   a pair of brackets, each of said brackets being mountable on opposite sides of a rear wheel of a bicycle, each of said brackets comprising:
      a first portion having a first end and a second end, said first portion having a pair of bends each being positioned between said first end and said second end to define an upper section forming an angle with a middle section and a lower section forming an angle with said middle section, said upper section having said first end being associated therewith, said lower section having said second end being associated therewith, said angle formed by said upper section and said middle section being supplementary with said angle formed by said middle section and said lower section, said upper section having a plurality of apertures each extending therethrough, said apertures being spaced apart from each other and being distributed between said middle section and said first end, a respective one of said apertures receiving an axle of the rear wheel of the bicycle having said first portion extending downwardly from the axle; and a second portion having an upper end a lower end;

a pair of shock absorbers, each of said shock absorbers being integrated into a respective one of said brackets such that each of said brackets is compressible and expandable, each of said shock absorbers having a top end and a bottom end, said top end of each of said shock absorbers being coupled to said second end of said first portion of said respective bracket, said bottom end of each of said shock absorbers being coupled to said upper end of said second portion of said respective bracket such that said first portion is urgeable toward or away from said second portion; and a pair of rollers, each of said rollers being rotatably coupled to a respective one of said brackets wherein each of said rollers is configured to roll along a support surface when the bicycle is ridden, each of said rollers being positioned on opposite sides of the bicycle wherein each of said rollers is configured to inhibit the bicycle from tipping thereby assisting a physically disabled user with riding the bicycle, each of said shock absorbers facilitating each of said rollers to move upwardly and downwardly on the support surface wherein each of said shock absorbers is configured to enhance comfort for the physically disabled user, each of said rollers being positioned adjacent to said lower end of said second section of said respective bracket, each of said rollers being oriented such that each of said roller has a rotational axis being oriented perpendicular to an axis extending through said upper end and said lower end of said second section of said respective bracket.

* * * * *